July 6, 1937.  E. P. HILL  2,086,360
WATER OUTLET FITTING
Filed July 11, 1934

Inventor
Edwin P. Hill
By Blackmore, Spencer & Flint
Attorneys

//Patented July 6, 1937//

UNITED STATES PATENT OFFICE 2,086,360

WATER OUTLET FITTING

Edwin P. Hill, Detroit, Mich., assignor to General Motors Corporation, Detroit, Mich., a corporation of Delaware Application July 11, 1934, Serial No. 734,610

6 Claims. (Cl. 236—34)

This invention relates to a water outlet fitting for an automobile engine and more particularly to a fitting within which may be supported a thermostat for controlling the flow of water in the cooling system.

Heretofore it has been customary to clamp the thermostat between the water outlet fitting and the top of the head of the motor in original installations and to place it in a hose connection by cutting the length of hose in two and inserting the thermostat between the two ends in an installation after the car has been assembled. In either of these instances, in order to take out the thermostat to repair or replace it, it is necessary to remove the hose connections. This involves considerable bother and the hose connections being resilient are easily destroyed by removing them from the system.

It is therefore an object of this invention to provide a fitting between the hose and the motor block in which the thermostat may be housed and from which it may easily be removed and replaced without removing the hose connections.

It is a further object to provide means for removal of the thermostat requiring a disassembly of a minimum of parts.

With these and other objects in view my invention resides in the construction as described in the specification, claimed in the claims and illustrated in the drawing, in which:

Figure 1:
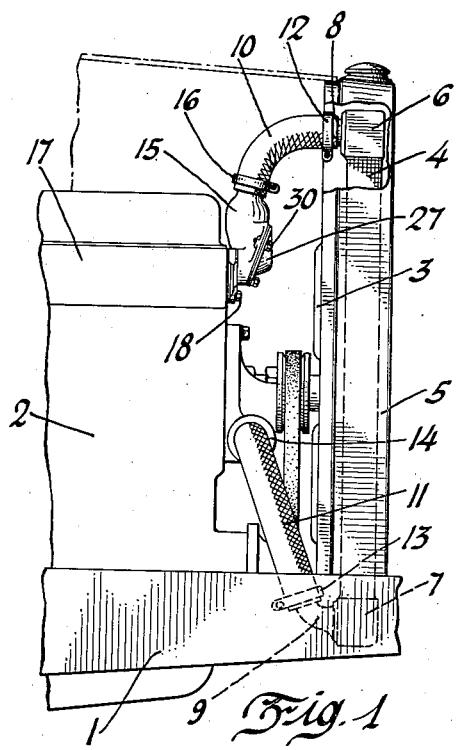
Figure 1 is a side elevation of the front portion of a motor car showing my fitting in position.

A motor car having a frame 1, supports at its forward end a motor 2. Upon the front of the motor is supported in the usual manner a fan 3. Ahead of the fan and supported upon the frame 1 is a radiator 4 enclosed by a radiator shell 5. At the top and bottom of the radiator are two tanks 6 and 7 respectively. Projecting rearwardly from these two tanks are two tubular hose connections 8 and 9 to which are clamped hose sections 10 and 11 by clamps 12 and 13. The rear end of the lower hose is connected to the usual cylinder jacket water intake 14 on the lower front section of the motor and is secured thereto by clamping means.

To the rear end of the upper hose 10 is connected by clamp 16 a fitting designated broadly as 15, which fitting is bolted directly to the upper front portion of the motor head and communicates with the water jacket therein to act as a water outlet.

Figure 2:
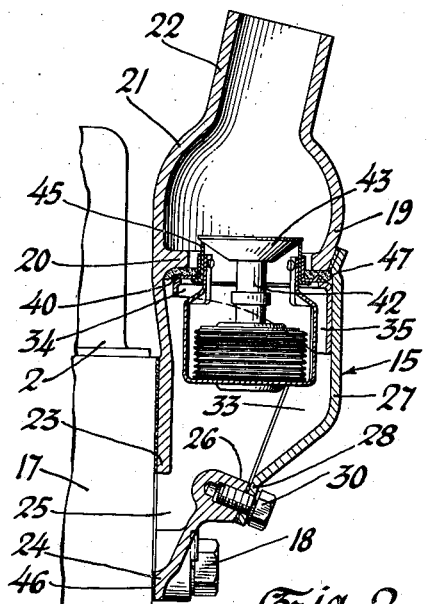
Figure 2 is an enlarged vertical sectional view through the fitting showing the thermostat in place.
Figure 3:
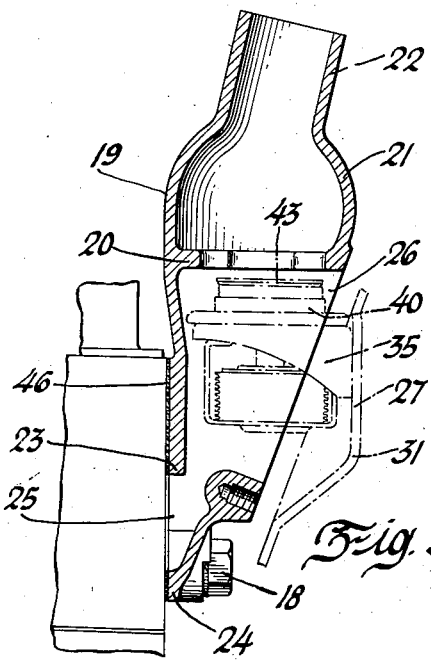
Figure 3 is a view similar to Figure 2 but showing the cover and thermostat in dash and dotted lines in a detached position.
Figure 4:
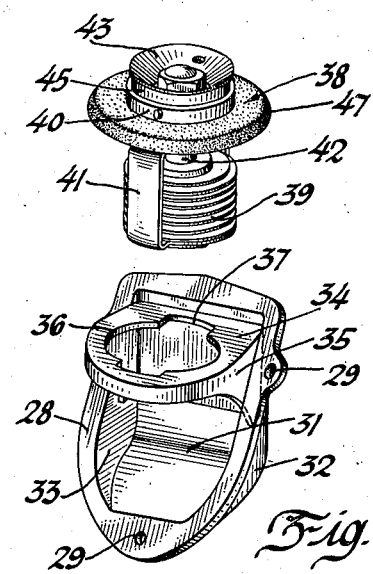
Figure 4 is a detail view of the cover and thermostat showing the two in spaced relation.

As best shown in Figure 2, the fitting 15 is secured on the front face of the head 17 of the motor 2 at the top thereof by bolts 18. The fitting 15 is a hollow casting 19 rougly tubular in form and secured in substantially a vertical position. Extending around the inner surface of the casting, approximately half way between the ends, is an annular ring 20 which separates the interior into two compartments. The upper compartment has parti-spherical walls 21 which merge into a tubular section 22 which fits inside the end of the hose section 10. The lower compartment is of an irregular shape. It extends downwardly for a distance, its cross section being roughly round. The inside edge then stops as at 23 and the outside edge tapers toward it but reaches the head 17 at a point 24 below 23. The water outlet 25 is located between points 23 and 24. The water therefore runs out of opening 25 and then turns at right angles and flows up through the fitting to the hose.

The front face of the lower compartment is cut away to provide an opening 26 therein over which is secured a cover plate 27. This plate is formed of a flanged edge portion 28 of the same shape as the opening in which are provided holes 29 for the insertion of bolts 30 to secure the cover to the casting. The body of the cover is dished outwardly in a V-shape on its longitudinal axis as shown at 31, the side portions 32 and 33 being substantially flat and extending back to the end of the V.

At an acute angle to the plane of the flange and near the top a bracket arm 34 is rigidly secured to the cover. This bracket has a flanged edge 35 which extends back parallel to the side walls 32 and 33 and is secured on each side to one of them. The top surface of the bracket has therein a circular opening 36 with two diametrically opposed ear-like extensions 37.

A thermostat 38 having a thermo-sensitive element 39 of the bellows type carried by a ring 40 through a stirrup 41, has also a dished poppet valve 43 secured to the movable end of the bellows through a valve stem 42. To the supporting ring 40 is secured a short tubular valve seat 45 to cooperate with the valve member 43.

The fitting 15 is assembled per se before any application to the motor with which it will be used. The thermostat unit is first inserted in the opening 36 in the bracket 34 with the legs of the stirrup in the extensions 37 until the ring 40 is seated on the upper face of the bracket. This assembly is then applied to the opening 26 in the side of the casting, the upper end of the thermostat being inserted in the opening in the annular ring 20 first and then the plate brought up tight so as to clamp the ring 40 between the bracket and this ring 20, a gasket 47 being interposed between the top of the supporting ring 40 and the annular ring 20 to seal this joint. The plate is finally bolted in place. It should be noted in connection with this design that the temperature sensitive bellows is entirely within the flow of the water, its axis lying parallel with the flow.

When it is desired to use the fitting it is first bolted to the front face of the head by bolts 18, a gasket 46 being inserted between the casting and the head to prevent leakage. The tubular end 22 is then clamped within the upper hose connection to complete the assembly.

From the foregoing it will be apparent that after the initial assembly all that will be necessary to do to remove the thermostat is to remove the bolts 30 and take off the cover plate 27. The thermostat may then be taken out of the cover plate and a new one inserted with very little trouble.

With the advent of hot water heaters for cars it is very frequently necessary to change the thermostat when a heater is installed in the car and I have here provided a simple and efficient way to do this.

I claim:

1. A fitting comprising a hollow body, a tubular portion on one end for connection to a radiator hose, means on the other end to connect it to a motor, an opening in one side, a plate to cover the opening having a bracket secured thereto to project into the body at right angles to the axis thereof when the plate is in place, an aperture in the bracket and a thermostat carried in the aperture by the bracket, whereby the thermostat will lie directly in the water line and regulate the flow thereof.

2. A water fitting comprising a hollow body secured to the front of a motor head, an opening in one face of the body, a cover plate for closing said opening, a bracket secured to the plate at an angle, said bracket having a hole therein, a thermostat fitting through the hole and supported by the bracket, an annular ring surrounding the inside of the body above the opening, a piece of packing material carried by the bracket rim surrounding the thermostat which bears against the annular ring to seal the joint when the whole is in assembled position.

3. A water fitting comprising a hollow body secured in an upright position on the front face of a motor head, an opening in the front face of the body, a plate for closing said opening, a circular ring bracket secured to the plate at an angle for carrying a thermostat and an annular ring surrounding the inside of the body above the side opening whereby when the plate and thermostat are applied to the opening the top of the thermostat will project up through the circular opening in the ring.

4. A fitting for application between a motor head and a connecting hose in a motor car comprising a hollow body having means at either end for connection to the head and hose respectively, an opening in the lower front face of the body, a cover plate to close the opening, an annular bracket integral with the plate and extending at an angle thereto, a thermostat assembly secured in the bracket, an annular rim extending around the inner surface of the body above the opening, packing material carried by the rim of the annular bracket which contacts the inner annular rim of the body to form a tight joint whereby the flow of water is entirely through the thermostat.

5. A fitting for application between a motor head and a connecting hose in a motor car comprising a hollow body having means at either end for connection to the head and hose respectively, an opening in the lower front face of the body, a cover plate to close this opening, means integral with the cover to support a thermostat assembly thereon, the thermostat having its axis coincident with the longitudinal axis of the body, a temperature sensitive portion of the thermostat lying below the supporting means on the cover and a poppet valve of the thermostat lying above the support and packing material between the thermostat and the body held in place by the supporting means whereby the flow of water will be longitudinally over the temperature sensitive means and through the poppet valve.

6. A fitting comprising a hollow body, an opening in one side of the body, a cover plate therefor, a flat bracket secured to the plate and extending into the body at right angles to the longitudinal axis thereof, an aperture in the bracket, a thermosensitive element and its valve passing through the aperture and supported solely by the bracket, the thermosensitive element lying on one side of the bracket and the valve mechanism on the opposite side.

EDWIN P. HILL.